United States Patent
Nakano et al.

(10) Patent No.: US 11,878,733 B2
(45) Date of Patent: Jan. 23, 2024

(54) STEERING CONTROL DEVICE, STEERING CONTROL METHOD, AND STEERING CONTROL SYSTEM

(71) Applicant: Hitachi Automotive Systems, Ltd., Hitachinaka (JP)

(72) Inventors: Hiroshi Nakano, Yokohama (JP); Tomoaki Fujibayashi, Atsugi (JP); Kazuya Takahashi, Sagamihara (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 309 days.

(21) Appl. No.: 17/255,335

(22) PCT Filed: Jul. 3, 2019

(86) PCT No.: PCT/JP2019/026468
§ 371 (c)(1),
(2) Date: Dec. 22, 2020

(87) PCT Pub. No.: WO2020/013053
PCT Pub. Date: Jan. 16, 2020

(65) Prior Publication Data
US 2021/0269094 A1    Sep. 2, 2021

(30) Foreign Application Priority Data
Jul. 12, 2018   (JP) ................................ 2018-132415

(51) Int. Cl.
*B62D 15/02*    (2006.01)
*B62D 7/15*     (2006.01)

(52) U.S. Cl.
CPC ....... *B62D 15/0285* (2013.01); *B62D 7/1509* (2013.01)

(58) Field of Classification Search
CPC ... B62D 15/0285; B62D 6/002; B62D 7/1509
See application file for complete search history.

(56) References Cited

U.S. PATENT DOCUMENTS

| | | | |
|---|---|---|---|
| 6,611,744 B1 * | 8/2003 | Shimazaki | ........... B62D 15/028 180/443 |
| 2018/0162446 A1 * | 6/2018 | Mikuriya | ............. B62D 15/028 |

FOREIGN PATENT DOCUMENTS

| | | |
|---|---|---|
| DE | 10 2008 012 685 B4 | 2/2011 |
| DE | 10 2014 225 594 A1 | 6/2016 |

(Continued)

OTHER PUBLICATIONS

Translation of Fujishima (Year: 2010).*

(Continued)

*Primary Examiner* — Kenneth J Malkowski
(74) *Attorney, Agent, or Firm* — Crowell & Moring LLP

(57) ABSTRACT

A steering control device according to the present invention is configured to obtain information on a parking position of a vehicle obtained by an external world recognition unit, and to output, based on the obtained information on the parking position, an instruction for moving a rear portion of the vehicle to a set position in a parking width direction to a rear-wheel steering device configured to control a steered angle of rear wheels of the vehicle. With this configuration, even when a timing or an angle for operating a steering wheel by a driver is not appropriate, or even when a steered angle of front wheels is limited, parking of the vehicle at the predetermined position in the parking width direction is facilitated.

6 Claims, 5 Drawing Sheets

(56) References Cited

FOREIGN PATENT DOCUMENTS

| | | | |
|---|---|---|---|
| DE | 10 2017 206 701 A1 | 10/2018 | |
| JP | 2009-78693 A | 4/2009 | |
| JP | 2010-76675 A | 4/2010 | |
| JP | 201076675 A * | 4/2010 | ............ B60R 21/00 |
| JP | 2011-225019 A | 11/2011 | |

OTHER PUBLICATIONS

International Search Report (PCT/ISA/210) issued in PCT Application No. PCT/JP2019/026468 dated Sep. 17, 2019 with English translation (six (6) pages).

Japanese-language Written Opinion (PCT/ISA/237) issued in PCT Application No. PCT/JP2019/026468 dated Sep. 17, 2019 with English translation (nine (9) pages).

German-language Office Action issued in German Application No. 11 2019 003 544.4 dated Mar. 6, 2023 with English translation (11 pages).

* cited by examiner

FIG. 3A
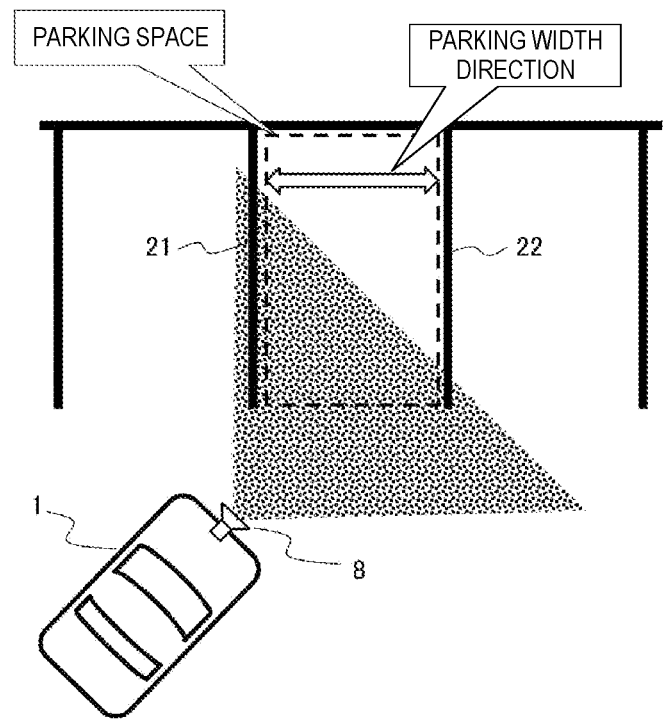
FIG. 3B
FIG. 3C
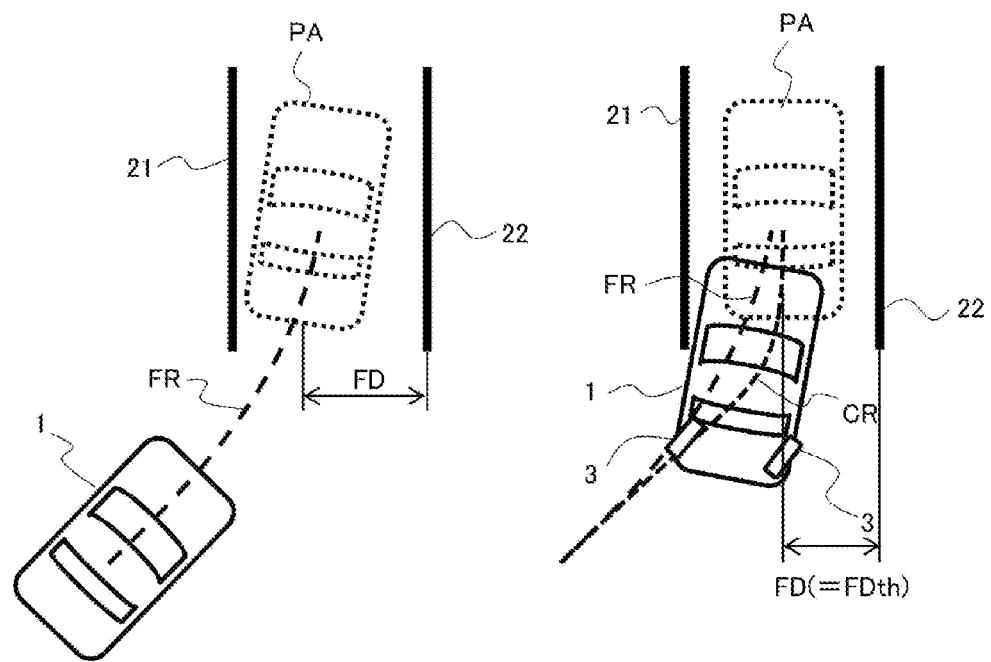

FIG. 4A
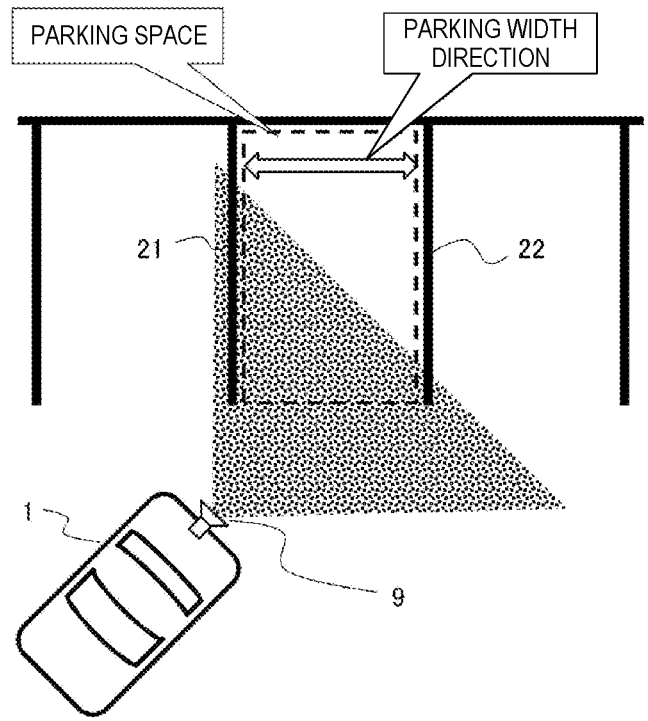
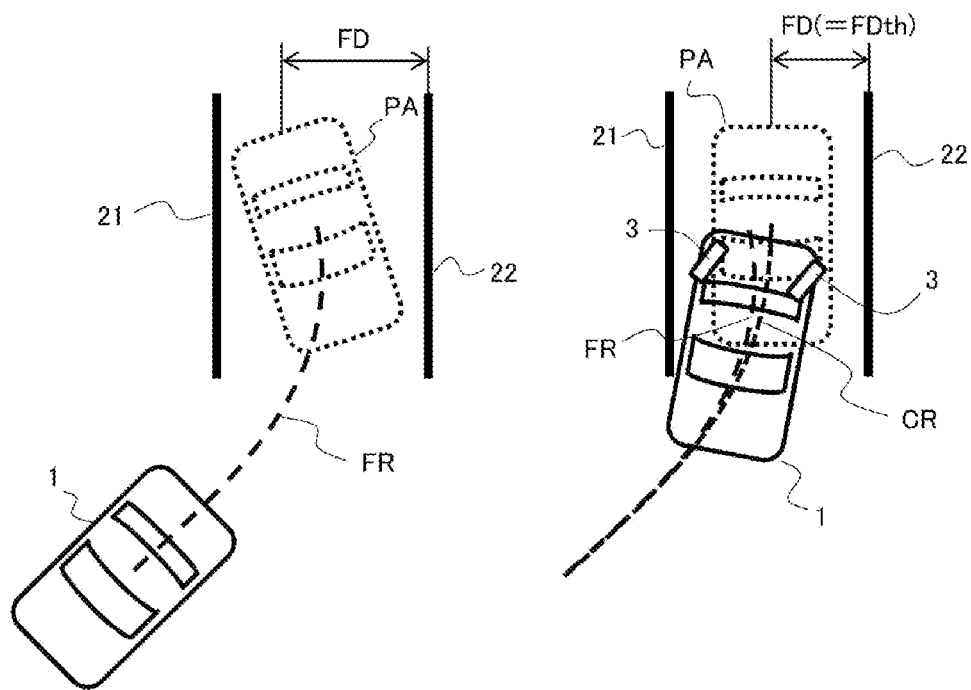
FIG. 4B
FIG. 4C

STEERING CONTROL DEVICE, STEERING CONTROL METHOD, AND STEERING CONTROL SYSTEM

TECHNICAL FIELD

The present invention relates to a steering control device, a steering control method, and a steering control system which are configured to control a steered angle of rear wheels when a vehicle is parked.

BACKGROUND ART

A steering control device as described in Patent Literature 1 is configured to control, when a four-wheeled vehicle is not parallel to a parking frame, a steered direction of front wheels and a steered direction of rear wheels to be different from each other, that is, provide anti-phase steering, and to control, when the four-wheeled vehicle is parallel to the parking frame, the steered direction of the front wheels and the steered direction of the rear wheels to be the same direction, that is, provide in-phase steering.

Moreover, in the above-mentioned steering control device, when the four-wheeled vehicle is not parallel to the parking frame, the anti-phase steering is provided, to thereby facilitate a change in direction of the four-wheeled vehicle. When the four-wheeled vehicle is parallel to the parking frame, the in-phase steering is provided to move the four-wheeled vehicle in parallel to the parking frame while maintaining the direction of the four-wheeled vehicle, to thereby facilitate an adjustment of left and right gaps between the four-wheeled vehicle and the parking frame.

CITATION LIST

Patent Literature

PTL 1: JP 2011-225019 A

SUMMARY OF INVENTION

Technical Problem

Incidentally, the steering control, which switches four-wheel steering between the anti-phase steering and the in-phase steering in accordance with whether or not the four-wheeled vehicle is parallel to a parking frame, increases operability during parking, but does not assist in parking the vehicle at a predetermined position in a parking width direction, and the vehicle may not thus easily be parked at the predetermined position in the parking width direction.

An object of the present invention is to provide a steering control device, a steering control method, and a steering control system which are capable of facilitating parking of a vehicle at a predetermined position in a parking width direction.

Solution to Problem

According to one embodiment of the present invention, in one aspect thereof, an instruction for moving a rear portion of a vehicle to a set position in a parking width direction is output to a rear-wheel steering device configured to control a steered angle of rear wheels of the vehicle, based on information on a parking position of the vehicle.

According to one embodiment of the present invention, the vehicle can be easily parked at the predetermined position in the parking width direction.

BRIEF DESCRIPTION OF DRAWINGS

FIGS. 3A to 3C are plan views for illustrating an operation during forward parking.

FIGS. 4A to 4C are plan views for illustrating an operation during backward parking.

DESCRIPTION OF EMBODIMENTS

Figure 1:
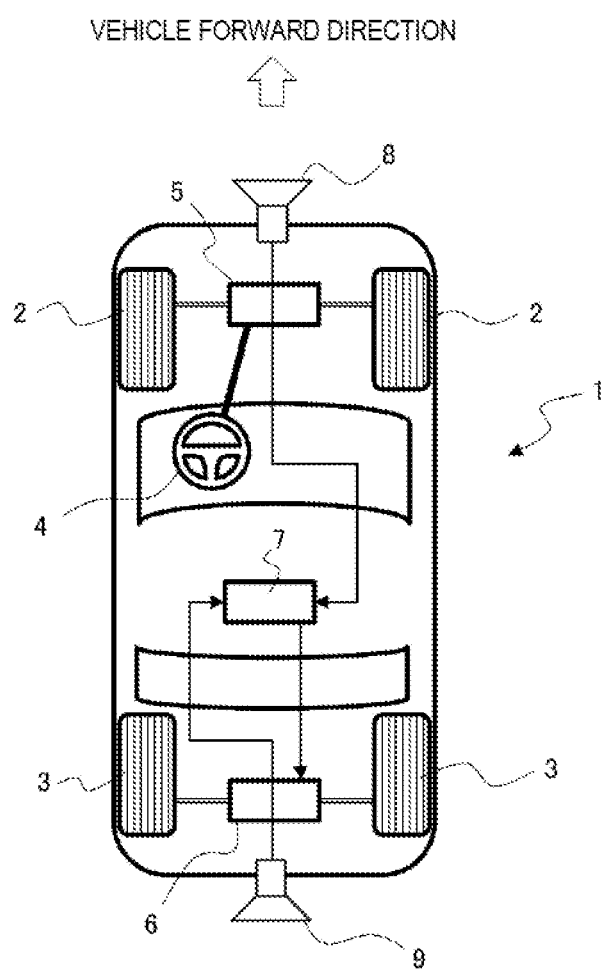
FIG. 1 is a diagram for illustrating a configuration of a steering control system for a vehicle.

Referring to the drawings, description is now given of a steering control device, a steering control method, and a steering control system according to an embodiment of the present invention.

FIG. 1 is a schematic configuration diagram of a steering control system according to the embodiment of the present invention.

A vehicle 1 of FIG. 1 is a four-wheeled vehicle including a pair of left and right front wheels 2, 2 and a pair of left and right rear wheels 3, 3.

A steering wheel 4 is operated by a driver or an autonomous steering device (not shown). A front-wheel steering device 5 is configured to operate a steered angle of the front wheels 2, 2 in accordance with input of the steering wheel 4.

Moreover, a rear-wheel steering device 6 is configured to operate a steered angle of the rear wheels 3, 3 in accordance with an instruction from a steering control device 7 described later.

Further, a first external world recognition sensor 8 and a second external world recognition sensor 9 are external world recognition units each configured to use an external world detection device, for example, a stereo camera, to recognize a parking position of the vehicle 1, obstacles, and the like.

In this configuration, the first external world recognition sensor 8 is a forward recognition sensor installed in a front portion of the vehicle 1 to obtain information on a parking position and obstacles forward of the vehicle 1. The second external world recognition sensor 9 is a backward recognition sensor installed in a rear portion of the vehicle 1 to obtain information on a parking position and obstacles backward of the vehicle 1.

The steering control device 7 (steering control unit) has a function of controlling the steered angle of the rear wheels 3, 3, to thereby assist the parking of the vehicle 1.

During the parking of the vehicle 1, there are a case in which a timing or an angle of the operation of the steering wheel 4 by the driver is not appropriate, a case in which the steered angle of the front wheels 2, 2 is limited by a mechanical factor or an environmental factor, and a case in which the vehicle 1 cannot be parked at a predetermined position in a parking width direction (for example, at the center in the parking width direction) only by front wheel steering provided by manual or autonomous parking control unless the vehicle 1 is moved in a front-and-rear direction (a steering direction is switched) a plurality of times.

Thus, the steering control device 7 detects such a possibility that the vehicle 1 is not to be parked at the predetermined position in the parking width direction based on the angle of the steering wheel 4, the information on the parking position recognized by the external world recognition sensors 8 and 9, and the like, and corrects a travel direction of the vehicle 1 through the rear wheel steering, to thereby facilitate the parking of the vehicle 1 at the predetermined position in the parking width direction.

The parking width direction is a vehicle width direction (left-and-right direction) of a parking space.

Figure 2:
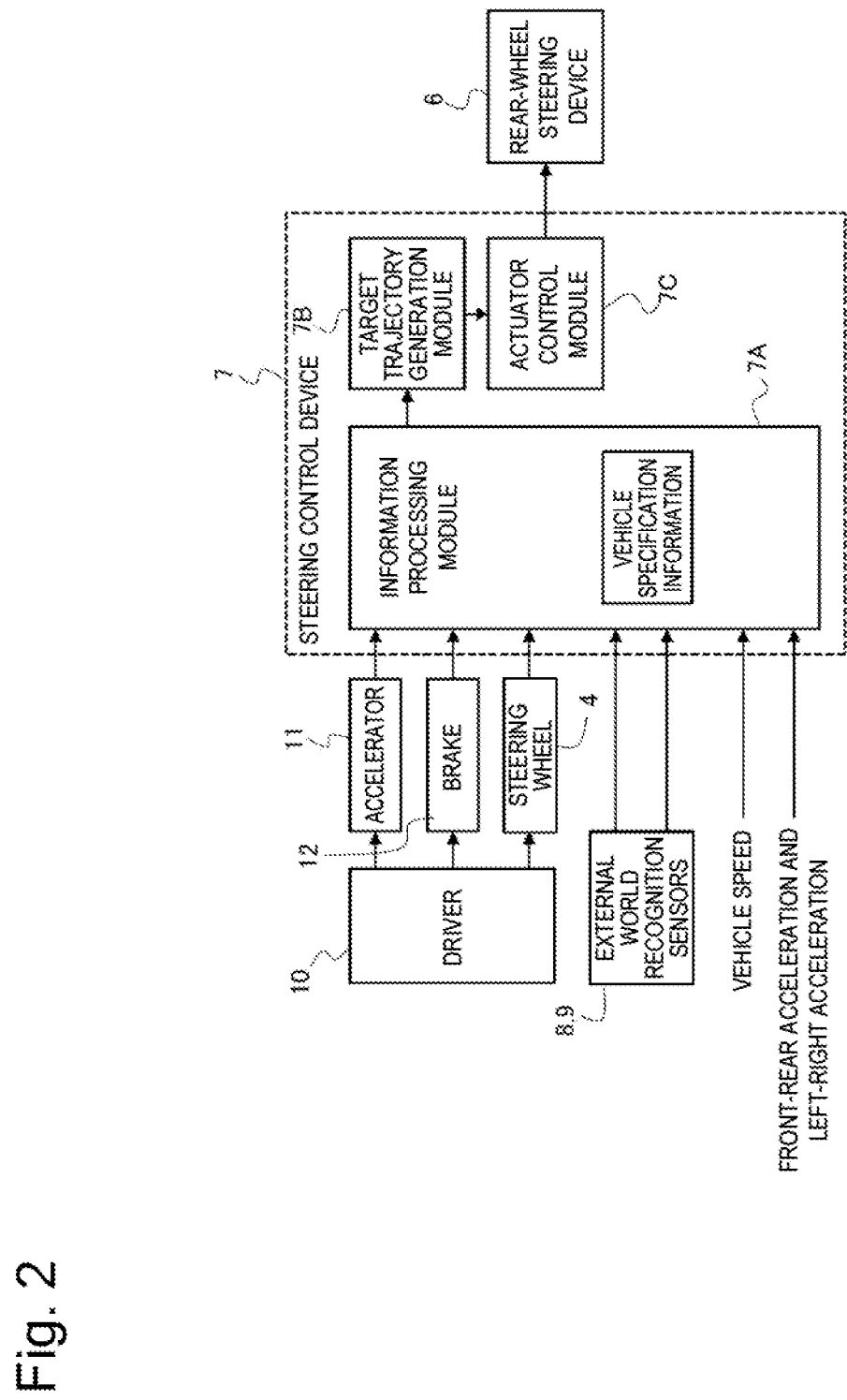
FIG. 2 is a functional block diagram of the steering control system for a vehicle.

FIG. 2 is a functional block diagram of the steering control device 7 configured to output the instruction relating to the steering of the rear wheels 3, 3 to the rear-wheel steering device 6.

The steering control device 7 is an electronic control device provided with a microcomputer including a microprocessor unit (MPU), a read only memory (ROM), a random access memory (RAM), and the like.

The steering control device 7 has, as software, functions of an information processing module 7A, a target trajectory generation module 7B, and an actuator control module 7C.

The information processing module 7A inputs, in addition to the external world recognition information from the external world recognition sensors 8 and 9, information on operation states of the vehicle 1 and information on operations performed by the driver 10.

Herein, the information on the operation states of the vehicle 1 is information on a travel speed (vehicle speed) of the vehicle 1, information on an acceleration in the front-and-rear direction and an acceleration in the left-and-right direction of the vehicle 1, and the like. The information on the operations performed by the driver 10 is information on an operation performed on an accelerator pedal 11 by the driver 10, information on an operation performed on a brake pedal 12 by the driver 10, information on an operation performed on the steering wheel 4 by the driver 10, and the like.

Moreover, the information processing module 7A includes a memory storing information on specifications of the vehicle 1.

The information processing module 7A predicts a moving path from a current position of the vehicle 1 based on the information on the operation states of the vehicle 1, the information on the operations performed by the driver 10, the external world recognition information (information on the parking position), and further, the specification information on the vehicle 1.

After that, the information processing module 7A determines whether or not the rear-wheel steering control (parking assist through the rear wheel steering) is required to park the vehicle 1 at the predetermined position in the parking space in the parking width direction based on the moving path that has been predicted (hereinafter referred to as "predicted moving path").

The target trajectory generation module 7B corrects the predicted moving path based on the predicted moving path generated by the information processing module 7A, to thereby generate a corrected moving path (target trajectory) to park the vehicle 1 at the predetermined position in the parking width direction.

After that, the actuator control module 7C obtains a rear-wheel steered angle instruction value (rear-wheel steering trajectory) in a time series for achieving the corrected moving path generated by the target trajectory generation module 7B, and successively outputs the obtained rear-wheel steered angle instruction value (rear-wheel steering trajectory) to the rear-wheel steering device 6.

The rear-wheel steering device 6 controls a steering actuator (for example, an electric motor) based on the rear-wheel steered angle instruction value (steered angle instruction) from the actuator control module 7C, to thereby adjust the steered angle of the rear wheels 3, 3 to the rear-wheel steered angle instruction value.

The external world recognition sensors 8 and 9 can obtain recognition information on the parking position and obstacles through image processing of a monocular camera, and can also obtain recognition information on the parking position and the obstacles by external world recognition devices, which are shape recognition devices such as a stereo camera and a laser radar.

Further, the driver 10 may be an automatic parking device (electronic control device) configured to process the recognition information on the parking position and the obstacles obtained by the external world recognition sensors 8 and 9, to thereby automatically execute parking operations (accelerator operation, brake operation, and front-wheel steering).

FIG. 3(A) to FIG. 3(C) are schematic views for illustrating a method of parking the vehicle 1 at a predetermined position (for example, the center) of a parking space in the parking width direction by the steering control device 7 controlling the steered angle of the rear wheels 3, 3 when the vehicle 1 is parked forward.

FIG. 3(A) is a view for illustrating a method of recognizing the parking position (parking space) forward of the vehicle 1.

In this case, the steering control device 7 (information processing module 7A) uses the first external world recognition sensor 8 installed in the front portion of the vehicle 1 to recognize parking frames 21 and 22, for example, white lines that partition the parking space, and obtains a relative positional relationship between the parking position sandwiched between the parking frames 21 and 22, and the vehicle 1.

A section sandwiched between the parking frames 21 and 22 is the parking space corresponding to one vehicle. A direction in which the parking frames 21 and 22 are arranged corresponds to the parking width direction (vehicle width direction).

The parking position is not limited to the section sandwiched between the parking frames (white lines), and may be a space partitioned by other vehicles, walls, curbstones, and the like.

FIG. 3(B) is a view for illustrating a method of generating the predicted moving path of the vehicle 1.

The predicted moving path is predicted data on the moving path of the vehicle 1 from the current position to the parking position of the vehicle 1.

The steering control device 7 (information processing module 7A) generates a predicted moving path FR of the vehicle 1 from the current position to the parking position of the vehicle 1 based on the recognition information on the parking frames 21 and 22, that is, the parking position, the operation information on the accelerator pedal 11, the operation information on the brake pedal 12, the operation information on the steering wheel 4, the information on the vehicle speed, the information on the acceleration in the front-and-rear direction and the acceleration in the left-and-right direction, the information on the specifications of the vehicle, and the like.

After that, the steering control device 7 obtains a predicted parking posture PA of the vehicle 1 based on the predicted moving path FR, and further obtains a distance FD from one end (parking frame 22) in the parking width direction to a center of a rear end portion of the vehicle 1 in the predicted parking posture PA.

That is, the distance FD represents a predicted position of the rear portion of the vehicle 1 in the parking width direction when the vehicle 1 has moved to the parking position.

FIG. 3(C) is a view for illustrating a method of parking the vehicle 1 at the parking position so that the rear portion of the vehicle 1 reaches the predetermined position (center) in the parking width direction through the rear wheel steering.

The steering control device 7 (target trajectory generation module 7B) determines that correction of the moving path through the rear wheel steering is required when the distance FD based on the predicted parking posture PA is longer by a predetermined distance or more, or is shorter by the predetermined distance or more, than a distance FDth (a half a width of the parking space) from the one end in the parking width direction to the center of the parking space. That is, when the distance FD substantially matches the distance FDth, which is the target distance, the steering control device 7 predicts that the rear portion of the vehicle 1 is to be positioned at the center in the parking width direction, and thus determines that the correction through the rear wheel steering is not required.

Meanwhile, the steering control device 7 predicts that the rear portion of the vehicle 1 deviates more from the center in the parking width direction toward the left direction or the right direction as the deviation between the distance FD and the distance FDth increases, and thus determines that the correction of the moving path through the rear wheel steering is required.

After that, the steering control device 7 generates a corrected moving path CR that reduces an absolute value of the deviation between the distance FD and the distance FDth to a value smaller than a set value, that is, positions the rear portion of the vehicle 1 at the substantial center (set position) of the parking position.

The steering control device 7 defines, in the generation of the corrected moving path CR, a plurality of control points between the current position to the parking position of the vehicle 1 for determining the moving path so that the rear portion of the vehicle 1 is positioned at the substantial center (set position) of the parking position. The steering control device 7 interpolates those control points through, for example, the B-spline curve interpolation, to thereby obtain interpolated points, and appropriately samples the interpolated points, to thereby form the corrected moving path CR (target moving path).

After that, the steering control device 7 (actuator control module 7C) sets target values of the steered angle (rear-wheel steered angle) of the rear wheels 3, 3 as a time series based on a lateral deviation between the predicted moving path FR and the corrected moving path CR and the like so that the vehicle 1 traces the corrected moving path CR to move forward toward the parking position, and successively outputs the target value to the rear-wheel steering device 6 as the rear-wheel steering instruction.

FIG. 4(A) to FIG. 4(C) are schematic views for illustrating a method of parking the vehicle 1 at the predetermined position (for example, the center) of the parking space in the parking width direction by the steering control device 7 controlling the steered angle of the rear wheels 3, 3 when the vehicle 1 is parked backward.

The steering control device 7 also executes the rear-wheel steering control to park the vehicle 1 at the predetermined position (center) of a parking space in the parking width direction in the backward parking as in the forward parking.

First, the steering control device 7 (information processing module 7A) uses the second external world recognition sensor 9 installed in the rear portion of the vehicle 1 to recognize the parking frames 21 and 22, for example, white lines that partition the parking space, and obtains a relative positional relationship between the parking position sandwiched between the parking frames 21 and 22, and the vehicle 1 (see FIG. 4(A)).

After that, the steering control device 7 (information processing module 7A) generates the predicted moving path FR based on the recognition information on the parking position, the operation information on the driver 10, the information on the operation states of the vehicle 1, the specification information on the vehicle 1, and the like. Further, the steering control device 7 obtains the distance FD from the one end (parking frame 22) in the parking width direction to the center of the rear end portion of the vehicle 1 from the predicted parking posture PA based on the predicted moving path FR (see FIG. 4(B)).

Moreover, the steering control device 7 (target trajectory generation module 7B) generates the corrected moving path CR that achieves the absolute value of the deviation between the distance FD and the distance FDth shorter than the set value (see FIG. 4(C)).

After that, the steering control device 7 (actuator control module 7C) sets target values of the steered angle (rear-wheel steered angle) of the rear wheels 3, 3 as a times series so that the vehicle 1 traces the corrected moving path CR to move forward toward the parking position, and successively outputs the target value to the rear-wheel steering device 6 as the rear-wheel steering instruction.

As described above, when the steering control device 7 predicts that the vehicle 1 is to be parked under a state in which the rear portion of the vehicle 1 is deviating from the center of the parking position in the parking width direction, the steering control device 7 corrects the moving path of the vehicle 1 through the rear-wheel steering control, to thereby provide such assist that the rear portion of the vehicle 1 is positioned at the center of the parking position in the parking width direction.

Thus, even when the timing and the angle of the front wheel steering are not appropriate, or even when the steered angle of the front wheels 2, 2 is limited, it becomes easier to park the vehicle 1 at the center of the parking position in the parking width direction.

Moreover, the vehicle 1 includes the external world recognition sensors 8 and 9 in the front portion and the rear portion, respectively, and hence the steering control device 7 can execute the rear-wheel steering control for the parking assist both in the forward parking and the backward parking.

The external world recognition sensors 8 and 9 (external world recognition units) may execute recognition processing for the parking position only once at a start of the parking operation. However, the external world recognition sensors 8 and 9 may successively execute the recognition processing for the parking position during the parking operation, that is, during the movement of the vehicle 1 toward the parking position, to thereby be able to correct the recognized information on the parking position.

Moreover, when the external world recognition sensors 8 and 9 recognize obstacles such as other vehicles, humans, and objects other than the moving path of the vehicle 1, the steering control device 7 (target trajectory generation module 7B) may generate the corrected moving path CR so as to avoid those obstacles.

Moreover, the steering control device 7 (information processing module 7A and target trajectory generation module 7B) may generate the predicted moving path FR and the corrected moving path CR only once at the start of the parking operation. However, the steering control device 7 may successively execute the generation of the predicted moving path FR and the corrected moving path CR during the parking operation, to thereby be able to correct the target trajectory in the rear-wheel steering control.

Moreover, the steering control device 7 (information processing module 7A) obtains the distance FD from the one end of the parking position in the parking width direction to the center of the rear portion of the vehicle 1 as the data indicating the deviation of the parking posture. However, the steering control device 7 may obtain a distance from the center in the parking width direction to the center of the rear portion of the vehicle 1, a distance from one end in the parking width direction to a side end of the vehicle 1, and the like as the data indicating the deviation of the parking posture.

Moreover, the parking position is partitioned by other vehicles and walls, side ends of the other vehicles and the walls may be set to measurement references for the distance indicating the deviation of the parking posture.

Moreover, the position target in the parking width direction of the vehicle 1 is not limited to the center. The position target may be a position deviating from the center in the parking width direction (left-and-right direction), or the position target of the parking width direction may be configured so that the driver can freely change the position target within a set range.

Figure 5:
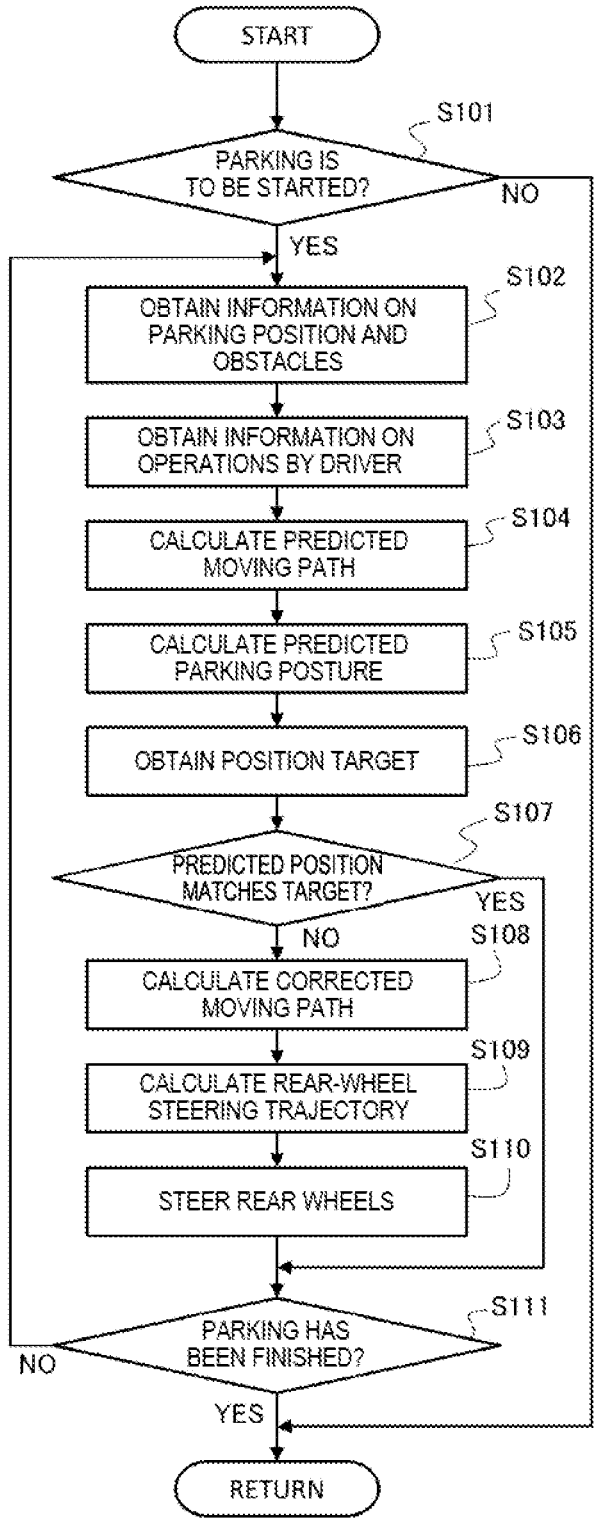
FIG. 5 is a flowchart for illustrating a procedure of rear-wheel steering control.

A flowchart of FIG. 5 is an illustration of a procedure of the rear-wheel steering control for the parking assist by the steering control device 7.

In Step S101, the steering control device 7 determines whether or not there is brought about a state in which the parking of the vehicle 1 (own vehicle) is to be started.

The steering control device 7 can determine the start of the parking (start of the rear-wheel steering control for the parking assist) based on recognition of a parking place by the external world recognition sensors 8 and 9, a parking instruction (parking assist start instruction or an instruction to select the parking position) given by the driver, recognition of a parking lot based on a combination of measurement of the position of the vehicle 1 by the global positioning system (GPS) and map data, or the like.

When the steering control device 7 determines that the parking is to be started, the steering control device 7 proceeds to Step S102, and obtains information on positions of the parking frames, positions of obstacles, and the like existing around the vehicle 1 from the external world recognition sensors 8 and 9.

After that, in Step S103, the steering control device 7 obtains the information on the operation information on the driver, the information on the operation states (behaviors) of the vehicle 1, and the like.

The operation information on the driver is the operation information on the accelerator pedal 11, the operation information on the brake pedal 12, the operation information on the steering wheel 4, and the like. Moreover, the information on the operation states of the vehicle 1 is the information on the speed, the acceleration in the front-and-rear direction, the acceleration in the left-and-right direction, and the like.

After that, in Step S104, the steering control device 7 predicts the moving path of the vehicle 1 to the parking position based on the obtained various types of information, and generates the predicted moving path FR, which is the trajectory from the current position to the parking position.

Further, in Step S105, the steering control device 7 obtains the predicted parking posture PA of the vehicle 1 based on the predicted moving path FR. The steering control device 7 further obtains the distance FD from the center of the rear portion of the vehicle 1 in the predicted parking posture PA to the one end (parking frame 22) in the parking width direction.

After that, in Step S106, the steering control device 7 obtains the position target in the rear portion of the vehicle 1 as the target value of the distance FD. The target value of the distance FD is, for example, the distance corresponding to the center in the parking width direction, and may be any distance set by the driver.

After that, in Step S107, the steering control device 7 compares the distance FD and the distance FDth, which is the determination value (threshold value) based on the target value obtained in Step S106, with each other, to thereby predict whether or not the rear portion of the vehicle 1 is parked at the substantial center in the parking width direction.

In this case, when the distance FD is close to the distance FDth, and it can thus be predicted that the rear portion of the vehicle 1 is parked at the substantial center in the parking width direction without the assist by the rear-wheel steering control, the steering control device 7 determines that the parking assist that steers the rear wheels 3, 3 is not currently required. Then, the steering control device 7 bypasses Step S108 to Step S110, in which the rear-wheel steering control is executed for the parking assist, and proceeds to Step S110.

That is, when it can be predicted that the rear portion of the vehicle 1 is parked at the substantial center in the parking width direction without the assist of the rear-wheel steering control, the steering control device 7 stops the rear-wheel steering control for the parking assist, and does not thus steer the rear wheels 3, 3.

Meanwhile, when the distance FD is different from the distance FDth by the predetermined distance or more, and it can thus be predicted that the rear portion of the vehicle 1 is parked at a position deviating from the center in the parking width direction unless the assist through the rear-wheel steering control is provided, the steering control device 7 proceeds to Step S108 to Step S110, and executes the parking assist that corrects the moving path through the rear wheel steering so that the vehicle 1 is parked under the state in which the rear portion of the vehicle 1 is positioned at the center of the parking width direction.

In the parking assist through the rear wheel steering, in Step S108, the steering control device 7 generates the corrected moving path CR that achieves the state in which the rear portion of the vehicle 1 at the parking position is located at the substantial center (set position) in the parking width direction.

After that, in Step S109, the steering control device 7 calculates the time-series data (rear-wheel steering trajectory) on the target steered angle of the rear wheels 3, 3 so as to move the vehicle 1 along the corrected moving path CR.

After that, in Step S110, the steering control device 7 outputs the target steered angle of the rear wheels 3, 3 obtained in Step S108 as the steering instruction to the rear-wheel steering device 6.

The rear-wheel steering device 6 controls the steering actuator for the rear wheels 3, 3 based on the target steered angle obtained from the steering control device 7, to thereby execute the rear wheel steering of adjusting the steered angle of the rear wheels 3, 3 to the target steered angle.

After that, the steering control device 7 proceeds to Step S111, and determines whether or not the parking of the vehicle 1 has been finished.

In this case, the steering control device 7 can determine whether or not the parking of the vehicle 1 has been finished based on the steering information on the driver such as a shift position and an on/off state of a parking brake, the information on the operation states of the vehicle 1 such as the speed and the accelerations of the vehicle, the recognition information obtained by the external world recognition sensors 8 and 9, an assist finish instruction given by the driver, and the like.

When the parking of the vehicle 1 has not been finished, that is, when the vehicle 1 is in the course of the parking, the steering control device 7 returns to Step S102, and repeats the generation of the predicted moving path FR and the corrected moving path CR, and further repeats the rear wheel steering based on the corrected moving path CR.

The steering control device 7 returns from Step S111 to Step S109, and can continue the rear wheel steering based on the corrected moving path CR generated at the start of the parking until the parking is finished.

After that, when the parking of the vehicle 1 is finished, the steering control device 7 stops the rear-wheel steering control for the parking assist.

As described above, when the vehicle 1 is parked, the moving path of the vehicle 1 is corrected to the path that locates the rear portion of the vehicle 1 at the predetermined position in the parking width direction at the parking position. Thus, the parking of the vehicle 1 at the predetermined position in the parking width direction is facilitated.

The technical concepts described in the above-mentioned embodiment may be used in combination as required, as long as no conflict arises.

Further, although the details of the present invention are specifically described above with reference to the preferred embodiment, it is apparent that persons skilled in the art may adopt various modification aspects based on the basic technical concepts and teachings of the present invention.

For example, when the external world recognition sensors 8 and 9 are cameras, an image taken by the external world recognition sensor 8 or 9 may be displayed on a monitor screen provided for a driver seat of the vehicle 1, and further, an image showing the predicted moving path FR and the corrected moving path CR may be superimposed on the taken image.

Moreover, when the steering control device 7 predicts that the vehicle 1 cannot be moved to the predetermined position in the parking width direction even when the rear wheel steering is executed, the steering control device 7 may warn the driver, through screen display, sound, and the like, that an expected parking assist cannot be executed.

Moreover, the steering control device 7 may stop the rear wheel steering in a case in which the driver stops the vehicle 1 in the course of the parking, for example.

The present invention is not limited to the embodiment described above, and encompasses various modification examples. The embodiment has described the present invention in detail for the ease of understanding, and the present invention is not necessarily limited to a mode that includes all of the configuration described above. A part of the configuration of one embodiment may be replaced with the configuration of another embodiment, and the configuration of one embodiment may be used in combination with the configuration of another embodiment. In each embodiment, another configuration may be added to, deleted from, or replace a part of the configuration of the embodiment.

The present application claims a priority based on Japanese Patent Application No. 2018-132415 filed on Jul. 12, 2018. All disclosed contents including Specification, Scope of Claims, Drawings, and Abstract of Japanese Patent Application No. 2018-132415 filed on Jul. 12, 2018 are incorporated herein by reference in their entirety.

REFERENCE SIGNS LIST

1 . . . vehicle, 2 . . . front wheel, 3 . . . rear wheel, 4 . . . steering wheel, 5 . . . front-wheel steering device, 6 . . . rear-wheel steering device, 7 . . . steering control device (steering control unit), 8, 9, . . . external world recognition sensor (external world recognition unit)

The invention claimed is:

1. A steering control device configured to:
obtain a parking position where a vehicle is to be parked based on the information obtained by an external world recognition sensor;
generate a predicted moving path which is a moving path from the current position to the parking position of the vehicle based on the parking position, operation information of the vehicle, operation states of the vehicle, and specifications of the vehicle,
obtain a predicted parking posture when the vehicle is parked in the parking position based on the predicted moving path,
obtain a first distance from the one end in the parking width direction of the parking position to a center of a rear end portion of the vehicle in the predicted parking posture,
compare the first distance with a second distance from one end in the parking width direction of the parking position to a center of a parking position,
when the absolute value of the deviation between the first distance and the second distance is equal to or greater than a predetermined value, generate a corrected moving path that achieves the absolute value of the deviation between the first distance and the second distance shorter than the predetermined value by steering the rear wheel of the vehicle, and
control a steering actuator that steers the rear wheels based on the predicted moving path and the corrected moving path so that the vehicle is parked in the parking position along the corrected moving path.

2. The steering control device according to claim 1, wherein the steering control device is configured to obtain the corrected moving path so as to avoid an obstacle obtained by the external world recognition sensor.

3. The steering control device according to claim 1, wherein the steering control device is configured to generate the predicted moving path and the corrected moving path a plurality of times during a parking operation.

4. The steering control device according to claim 1, wherein the steering control device steers only the front wheels to move the vehicle to the set position in the parking width direction.

5. A steering control method, comprising:
obtaining a parking position where a vehicle is to be parked based on the information obtained by an external world recognition sensor;
generating a predicted moving path which is a moving path from the current position to the parking position of the vehicle based on the parking position, operation information of the vehicle, operation states of the vehicle, and specifications of the vehicle, obtaining a predicted parking posture when the vehicle is parked in the parking position based on the predicted moving path, obtaining a first distance from the one end in the parking width direction of the parking position to a center of a rear end portion of the vehicle in the predicted parking posture, comparing the first distance with a second distance from one end in the parking width direction of the parking position to a center of a parking position, when the absolute value of the deviation between the first distance and the second distance is equal to or greater than a predetermined value, generating a corrected moving path that achieves the absolute value of the deviation between the first distance and the second distance shorter than the predetermined value by steering the rear wheel of the vehicle, and controlling a steering actuator that steers the rear wheels based on the predicted moving path and the corrected moving path so that the vehicle is parked in the parking position along the corrected moving path.

6. A steering control system, comprising:

an external world recognition sensor configured to obtain information on a parking position of a vehicle, wherein the parking position of the vehicle is where the vehicle is to be parked;

a steering control unit configured to obtain an instruction for moving a rear portion of the vehicle to a set position in a parking width direction by obtaining the information on the parking position obtained by the external world recognition sensor, generating a predicted moving path which is a moving path from the current position to the parking position of the vehicle based on the parking position, operation information of the vehicle, operation states of the vehicle, and specifications of the vehicle, obtaining a predicted parking posture when the vehicle is parked in the parking position based on the predicted moving path, obtaining a first distance from the one end in the parking width direction of the parking position to a center of a rear end portion of the vehicle in the predicted parking posture, comparing the first distance with a second distance from one end in the parking width direction of the parking position to a center of a parking position, and when the absolute value of the deviation between the first distance and the second distance is equal to or greater than a predetermined value, generating a corrected moving path that achieves the absolute value of the deviation between the first distance and the second distance shorter than the predetermined value by steering the rear wheel of the vehicle; and a rear-wheel steering device configured to input the instruction obtained by the steering control unit, and to control a steered angle of rear wheels of the vehicle.

* * * * *